June 14, 1966 W. G. YOUNG ETAL 3,255,588
CONSTANT VOLUME CLOSED LOOP HYDRAULIC SYSTEM
Filed Jan. 29, 1965 5 Sheets-Sheet 1

INVENTORS
WILLIAM G. YOUNG &
RONALD C. DEETER
BY
CAROTHERS AND CAROTHERS
THEIR ATTORNEYS

June 14, 1966 W. G. YOUNG ETAL 3,255,588
CONSTANT VOLUME CLOSED LOOP HYDRAULIC SYSTEM
Filed Jan. 29, 1965 5 Sheets-Sheet 2

INVENTORS
WILLIAM G. YOUNG &
RONALD C. DEETER
BY
CAROTHERS AND CAROTHERS
THEIR ATTORNEYS

June 14, 1966  W. G. YOUNG ETAL  3,255,588
CONSTANT VOLUME CLOSED LOOP HYDRAULIC SYSTEM
Filed Jan. 29, 1965  5 Sheets-Sheet 3

INVENTORS
WILLIAM G. YOUNG &
RONALD C. DEETER
BY CAROTHERS AND CAROTHERS
THEIR ATTORNEYS

June 14, 1966   W. G. YOUNG ET AL   3,255,588
CONSTANT VOLUME CLOSED LOOP HYDRAULIC SYSTEM
Filed Jan. 29, 1965   5 Sheets-Sheet 4

INVENTORS
WILLIAM G. YOUNG &
RONALD C. DEETER
BY
CAROTHERS AND CAROTHERS
THEIR ATTORNEYS

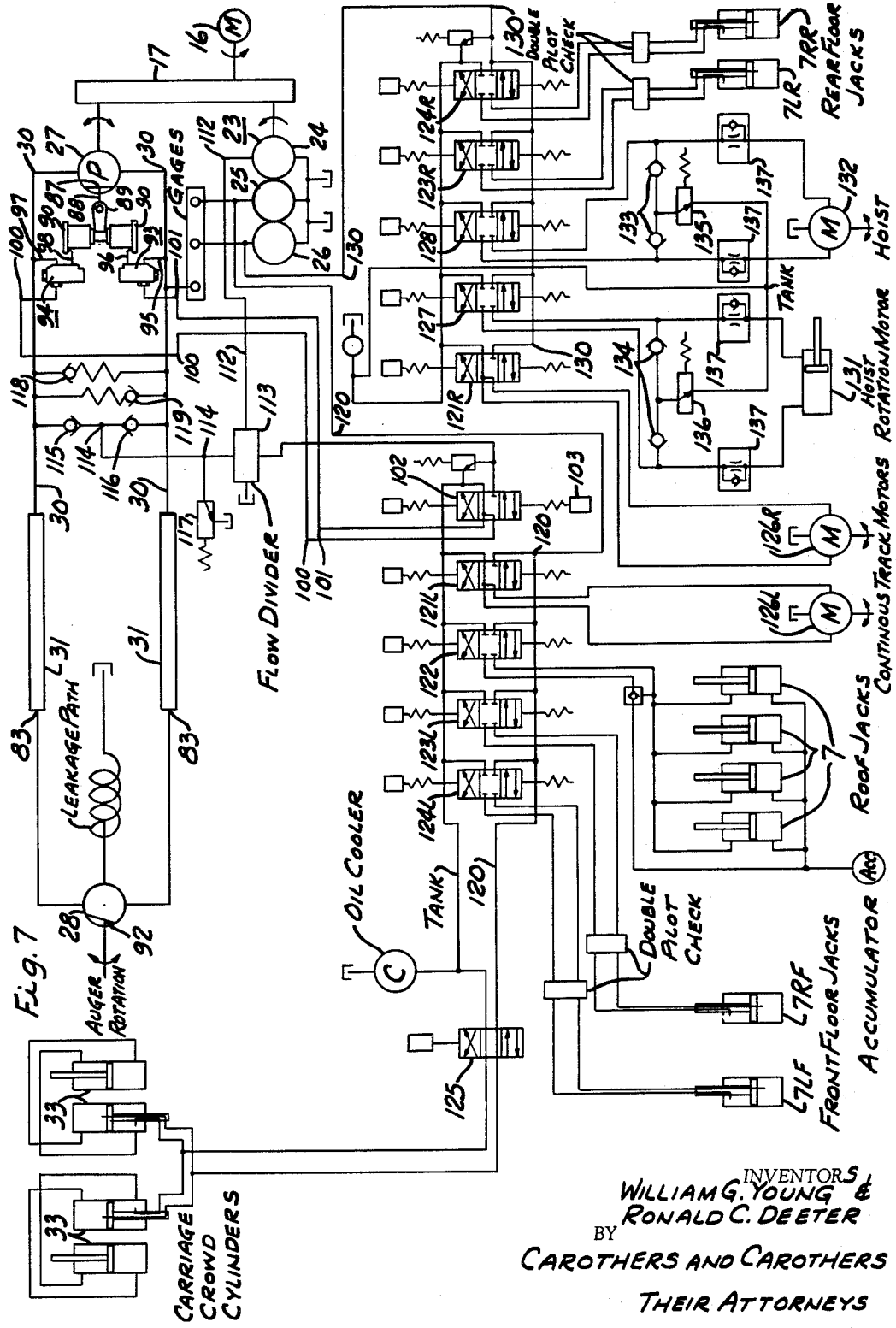

United States Patent Office 3,255,588
Patented June 14, 1966

3,255,588
CONSTANT VOLUME CLOSED LOOP HYDRAULIC SYSTEM
William G. Young and Ronald C. Deeter, Salem, Ohio, assignors to The Salem Tool Company, Salem, Ohio, a corporation of Ohio
Filed Jan. 29, 1965, Ser. No. 429,099
20 Claims. (Cl. 60—53)

This invention relates generally to closed loop hydraulic systems between fluid devices and more particularly to fluid devices such as a driving pump and driver motor connected together in a closed loop hydraulic system wherein the pump and motor are movable toward and away from each other.

A closed loop hydraulic system has no problems since the pump and motor have no relative movement toward and away from each other. However, such movement creates the problem of changing the volume in the system or using coiling and uncoiling flexible hose connections the latter of which is initially a source of many problems.

The answer to these problems is found in the present invention which provides a pair of telescoping valves which are slidable in sealed relation to each other in the amount necessary to separate the pump and motor of the hydraulic system. This telescopic slidable connection in the closed loop system requires an expansible and contractable chamber on each side of said closed loop and these chambers must be capable of expansion and contraction without changing volume which is the principal object of this invention.

Another object is the provision of a core tube and slide tube telescoping over said core tube and sealed therewith, and the core tube is selected so that each increment of its volume lying within the bore of the slide tube is equal to its increment displacement in the bore of the slide tube. Thus each core tube increment inserted or withdrawn from the bore of the slide tube respectively replaces or vacates an equal increment of volume in the bore of the slide tube. Thus regardless of whether or not the tubes are telescoping or being withdrawn from each other the resultant volume is the same. Thus such expansible chambers as these may be placed on opposite sides of the closed loop hydraulic system and relative movement of the pump and motor toward and away from each other may constantly vary without change in the volume of the closed loop.

This system permits the use of an axial piston variable volume Variac type hydraulic devices one forming the pump and the other forming the motor. Their construction is basically the same but the pump has a tiltable plate whereas the tiltable plate in the motor is fixed by the housing or is capable of being fixed in different angles of tilt by a hand screw. Thus by controlling the tilt of the plate in the pump one may dispose the plate normal to the rotary driving axis and the pump delivers nothing. By tilting the plate in opposite directions the pump pumps the liquid in opposite directions through the closed loop system and, of course, the motor is driven in opposite directions. Again the degree of tilt represents the amount of volume circulated by the pump per revolution. This means that the greater the tilt the greater the power transmitted by the liquid and the less the tilt the less the power transmitted and obviously the faster the unloaded motor can rotate. Thus the tilt of the plate in the pump depends upon the load required and this load may be made effective on the compensator to require more power as the load increases. All this is done without valves controlling the liquid flow in the closed circuit or loop, the pump is directly operative on the motor without any intervening parts and only the liquid pumped and its flow controls the operation of the motor and only the direction of tilt and the degree of tilt determines these factors.

A normal leakage may be expected in a pump of this character. However, it is readily replaced through a pressure line controlled by ap ressure relief valve and connected back-to-back and the relief valves connected to the opposite sides of the closed loop circuit which represents another object of this invention.

This invention may have many applications but it is particularly advantageous for use with mining machines wherein one or more rotary liquid motors are driven by one liquid pump in a closed loop circuit. Here the motors may be mounted with the pump on the carriage which is fed by another fluid motor or motors which may be on a movable carriage and the pump stationary in which case the expansion chambers are provided in opposite sides of the closed loop hydraulic circuit.

Other objects and advantages appear hereinafter in the following description and claims.

The accompanying drawings show for the purpose of exemplification without limiting this invention or the claims thereto, certain practical embodiments illustrating the principles of this invention; wherein FIG. 1 is a view in side elevation of an auger mining machine.

FIG. 7 is a diagrammatic view of the hydraulic circuits of the mining machine.

Figure 1:
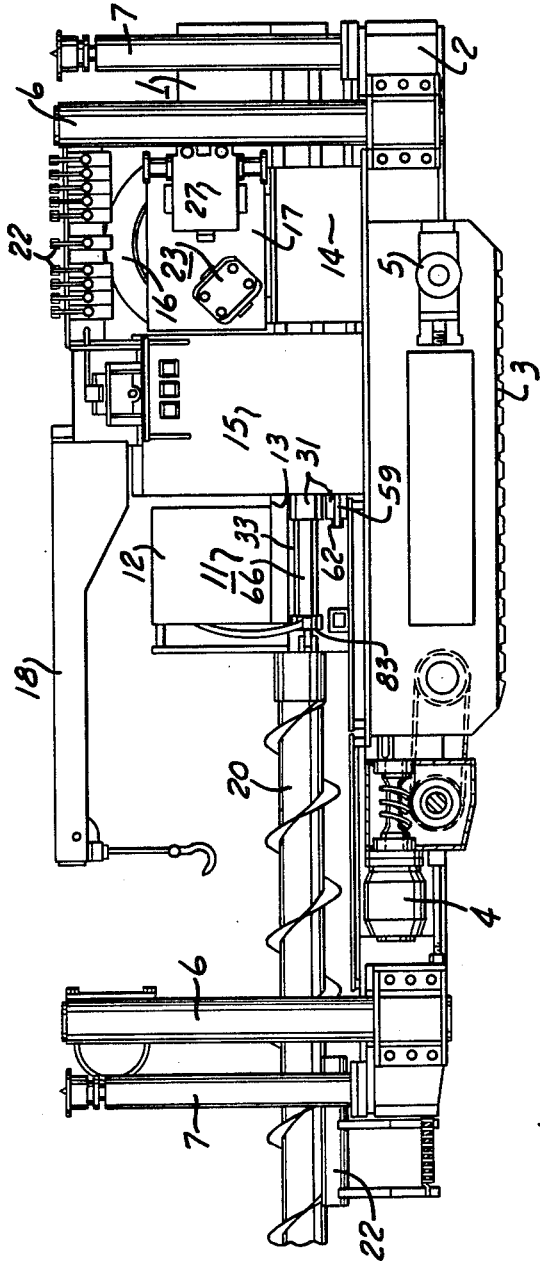

Referring to FIG. 1 of the drawings the mining machine 1 is an auger mining machine and comprises a frame 2 supported on endless tracks 3 on each side thereof driven by a hydraulic motor 4 connected to drive a cone drive worm that meshes with a cone drive gear secured to a drive sprocket at the front end of the endless chain 3 the rear end being provided with a take up as indicated at 5.

Each of the four corners of the frame 2 is provided with lifting jacks 6 together with a roof jack indicated at 7.

Figure 2:
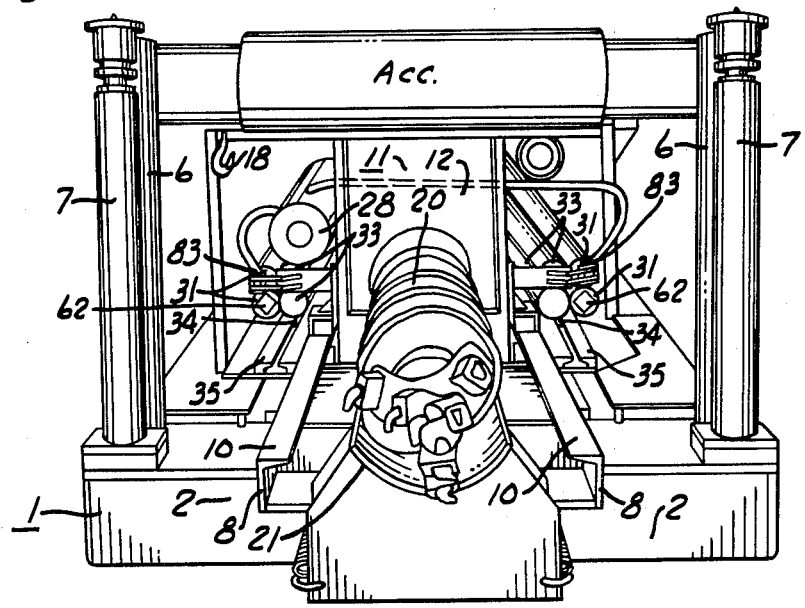
FIG. 2 is a front perspective view of an auger mining machine.
Figure 3:
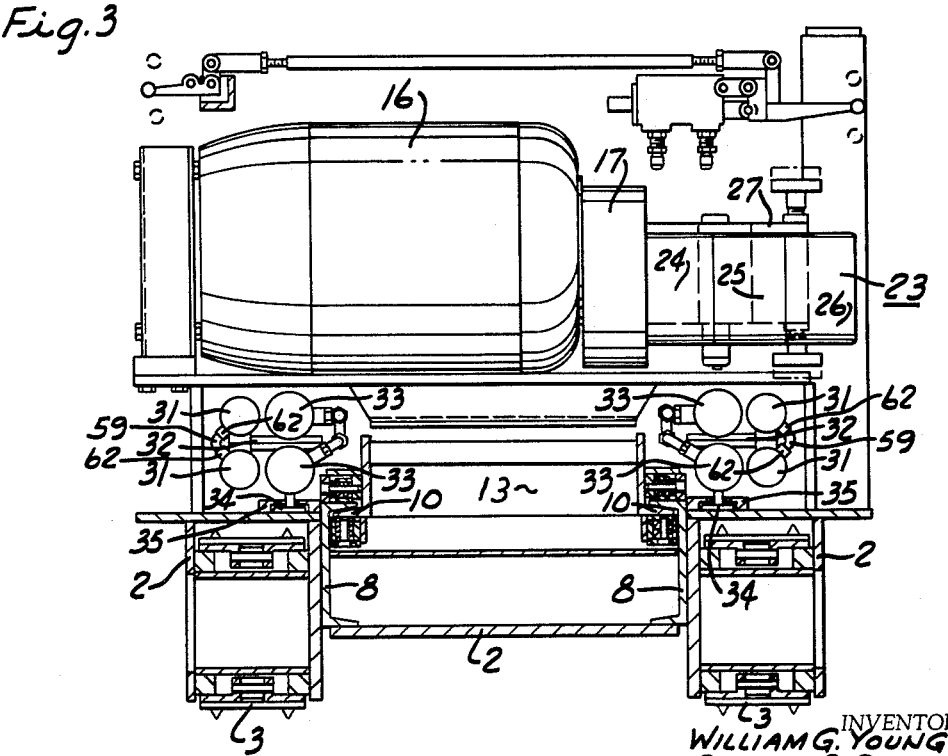
FIG. 3 is a transverse sectional view of an auger mining machine.

As illustrated in FIGS. 1 to 3 the frame 2 is provided with longitudinal channels 8, the upper inturned flange 10 of which forms the track for the carriage 11. The fore part of the carriage supports the drive mechanism in the gear case 12 whereas the aft part of the carriage is low as indicated at 13 and which slides under the rear bridge member 14 on top of the frame 2. The front bridge 15 is sufficiently high to receive the gear case 12 when the carriage 11 is retracted.

The bridge 14 supports the electric motor 16 together with the pump drive mechanism in the gear case 17.

The front bridge member 15 carries the motor operated hoist 18 which is provided with a suitable hook for inserting or removing auger sections as indicated at 20 in the pan 21 within the frame. The control members indicated by the valves and their valve operating handles are supported from the bridge members 14 and 15 as indicated at 22.

The gear box 17 carries the gear pump 23 which has three independent pumps indicated in FIG. 7 at 24, 25 and 26. The drive in the housing 17 is also connected to rotate the hydraulic pump of the aixal piston variable volume type of pump indicated at 27 which is connected to the motor 28 on the carriage 11 through a closed loop hydraulic system 30. This closed loop 30 is connected through the extension chambers 31 of which there are a pair on each side of the machine as shown in FIG. 3 and are supported by the independent carriages 32 that also carry the crowding cylinders 33 the lower one of which is provided with a foot 34 slidable in the ways 35 supported on top of the frame 2.

Figure 6:
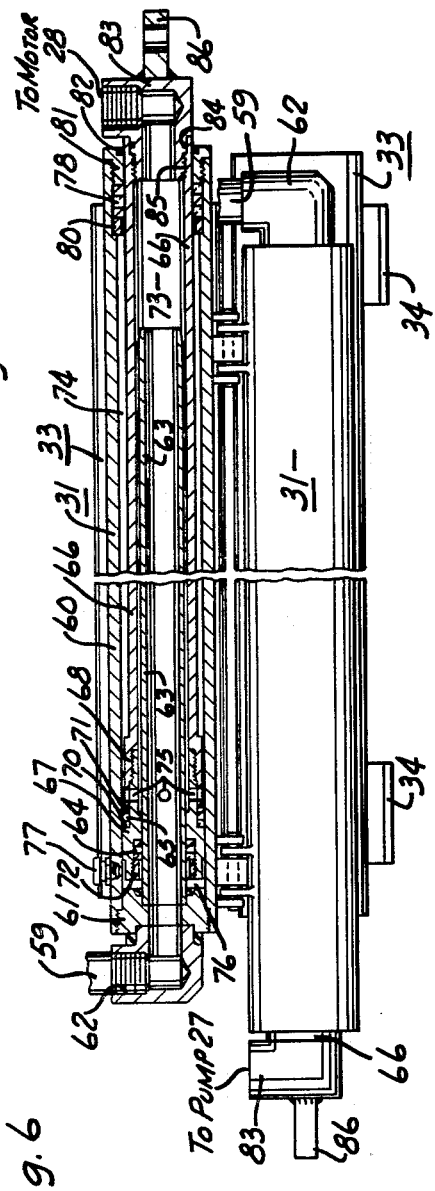
FIG. 6 is a view in elevation showing the crowd and extension chambers.

As shown in FIG. 6 each of the four cylinders are connected to the housing and their opposite ends open in opposite directions so that the rod or movable portion of the extension cylinders may be attached to the frame and to the carriage respectively which is also true of the piston rods 36 of the crowd cylinders that reciprocate the carriage back and forth on the track 10.

Figure 4:
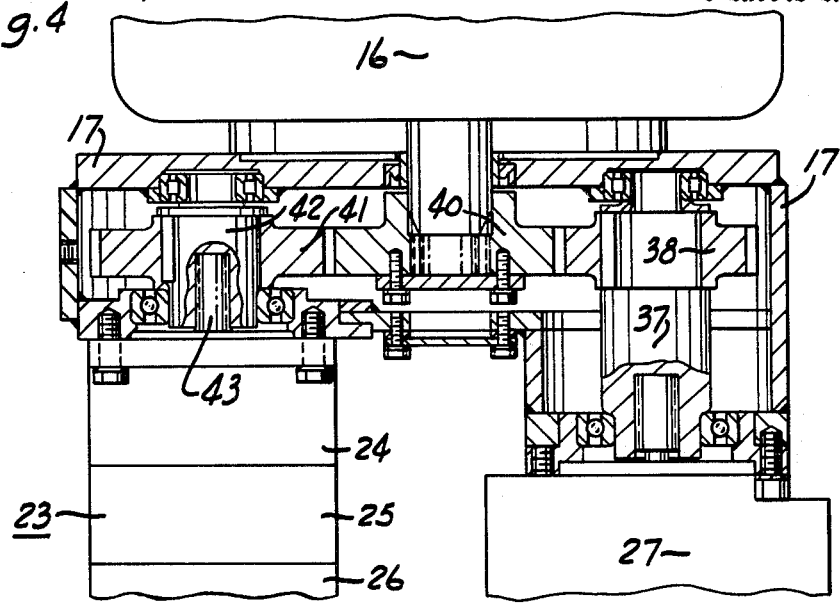
FIG. 4 is a sectional view showing the hydraulic pump drive.

Referring now to FIG. 4 the axial piston variable volume type of hydraulic pump illustrated at 27 has its shaft 37 journaled in antifrictional bearings in the gear case 17 and a pinion 38 on this shaft is continuously in mesh with the gear 40 on the end of the motor shaft 16. The gear 40 also drives a larger pinion 41 on the drive shaft 42 that is journaled in suitable bearings in the housing 17 for the purpose of driving each of the aligned pumps connected to the common drive shaft 43 for the purpose of rotating these gear pumps to deliver suitable hydraulic pressure. Thus when the motor 16 is started both the bank of pumps 23 and the axial piston variable volume type pump 27 are rotated in a given direction which remains constant.

Figure 5:
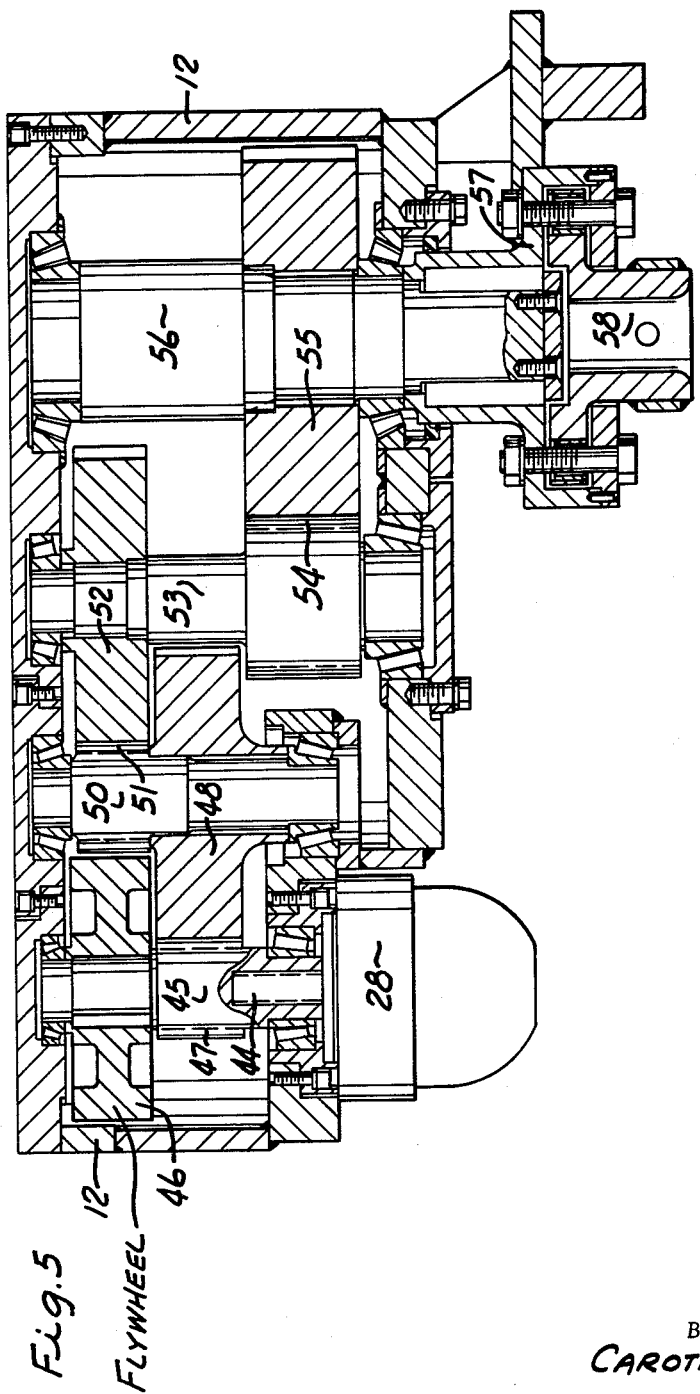
FIG. 5 is a sectional view showing a rotary hydraulic mining drive.

As shown in FIG. 5 the gear case 12 mounted on the carriage 11 is provided with the axial piston variable volume type motor 28 the shaft 44 of which operates the shaft 45 mounted on antifrictional bearings on the gear case 12. The shaft 45 carries the fly wheel member 46 and is also provided with a pinion 47 that meshes with the gear 48 of the first antifrictional journaled jack shaft 50 which in turn is provided with a pinion 51 that meshes with the gear 52 on the second jack shaft 53 that is likewise mounted in antifrictional bearings and is provided with a pinion 54 that drives the gear 55 secured to the drive shaft 56 mounted in antifrictional bearings in the gear box 12 which has a splined or keyed type shaft for receiving the coupling member 57 with its socket member 58 loosely bolted thereto and having a bore of square cross section receiving the ends of an auger 20. It will be noted that the antifrictional bearings increase in size from the motor to the drive socket in view of the fact that there is a reduction in speeds between the motor and each of the shafts in this drive. The hydraulic motor 28 and pump 27, both being of the axial piston variable volume type, are, as a matter of fact, one of a matched set of pump and motor which are substantially the same except that the tilting plate of the pump is movable from its position normal to the pump shaft in opposite directions for determining the direction of circulation through the closed loop 30 and the degree determining the volume or load transmitted, whereas the tilt plate of the motor 28 remains at a fixed position and is sometimes permanently fixed by the shape of the external casing. In this manner the tilting plate of the pump when held normal to its shaft will deliver no circulating liquid and the degree of tilting will determine the volume of liquid circulated in proportion to the angle of tilt of the plate. In other words very little power will be transmitted through the closed loop when the tilting plate is tilted only a few degrees. Whereas it will transmit a considerable amount of liquid when tilted the greatest possible number of degrees from its normal position which would provide the greatest power deliverable by the pump.

Such a pump and motor are known on the market as an axial piston variable volume type of hydraulic device. One form of a pump of this character is found in the open market as being sold under the tradename Variac by Gar Wood Industries, Inc.

The axial piston variable volume type of hydraulic pump and motor 27 and 28 respectively are thus moved toward and away from each other in view of the fact that the motor 28 is on the carriage 11 which is reciprocated to force the drill head and auger into the material to be mined. This motor could be connected with the pump through a long flexible hose that would permit the carriage to move back and forth. However, there is very little room to permit the use of such a flexible connection and the pressures created in this system due to very high torque characteristics is conducive to make a flexible hose connection inflexible due to pressure and also provides a source of leaks and other failures.

On the other hand if a telescopic connection were provided wherein an inner tube merely reciprocated into and out of an outer tube the volume of such an extension would increase. Such an extensible coupling would increase and introduce a variable that would have to be constantly compensated for by change in the volume of the pump which changes would not be for the purpose of inducing more or less torque as required in the operation of the mining device.

One of the important features of this invention is the provision of an extension chamber on each side of the closed loop hydraulic circuit which will permit the carriage to move the motor toward and away from the pump without a change in the volume of the system. This structure is illustrated in FIG. 6 wherein two of these extension chambers 31 are shown being disposed in opposite directions to each other and one of which is illustrated in section and wherein the outer tube 60 is provided with a plug 61 at one end which plug has a threadable connection 62 for adjoining the same through the hose 59 to the thread connection 62 at the opposite end of the outer tube 60 of the other extension chamber 31. The plug 61 is threadably secured in the end of the tube 60 and has an abutting shoulder. A core tube 63 has one end secured to the inner face of the plug 61 as by welding and the bore of the core tube together with the bore through the plug 61 and the bore into the threadable connection 62 is the same. The exterior of the core tube 63 and the interior of the outer tube 60 are polished for receiving the pack means 64 and 65 at the end of the slide tube 66. A head member 67 is threadably secured at 68 to the end of the slide tube 66 for the purpose of receiving the packing ring 65 between the shoulders 70 and the end 71 of the long section of the slide tube 66. The head 67 is also provided with an inner collar 72 for mounting the packing 64 in its bore which packing is slidable against the exterior surface of the core tube 63. Thus the outer end of the slide tube 66 is in slidable engagement with both the core tube 63 and the outer casing 60 through the packing as illustrated.

However, the slide tube 66 is free of the coaxial surfaces on each side thereof which represent the chambers 73 and 74 which are in fact connected through the aligned radial openings 75 through the head and the outer portion of the slide tube 66. Thus the chambers 73 and 74 are connected at all times with each other. However, these chambers 73 and 74 change in volume with respect to the chamber 76 which is within the outer tube 60 and at the end of the head of the slide tube 66. This chamber 76 is open to the atmosphere through the air vent member 77.

The outer end of the outer tube 60 carries the packing rings 78 which are seated between the annular ring 80 and the retaining ring 81. A resilient seal 82 is provided in the outer bore of the retaining ring 81 for the purpose of sealing the chamber 74 with respect to the slide tube 66.

The outer end of the slide tube 66 is provided with a threadable connection 83 which is likewise sealed at an O-ring 84 at the end of the threads 85 joining the same to the slide tube 66. At the opposite end the threaded connection 83 is provided with an I member 86 which joins the same to the carriage 11 so that the slide tube 66 may be coupled at this end to the carriage. When the carriage is moved the other I members 86 on the other extension chamber 31 will extend since they are joined to the base 2 of the machine and the corresponding connections 83 will be connected to the pump 27 and the motor 28 respectively on both sides of the carriage as shown in FIG. 2.

Referring again to the extension tube 31 shown in section in FIG. 6 the core tube 63 that extends into the chamber 73 is of such internal and external diameter that each increment of its axial length is equivalent in volume to the increment increase of the chamber 76 beyond the head 67 of the slide tube 66. Thus as the slide tube 66 is moved to the right in FIG. 6 the chamber 76 becomes increasingly larger in proportion to each longitudinal increment of movement of the slide with respect to each longitudinal increment of the core tube 63. Thus the chambers 73 and 74 which are connected through the ports 75 remain constant in volume because the chamber 76 increases equally in volume to the increment volume of the core tube 63 that is being withdrawn from the chamber 73.

The chambers 73 and 74, which are always connected through the radial ports 75, do decrease in volume by increments longitudinally of the slide tube and to the same extent as the increments of volume of the core tube 63 being withdrawn. In other words the actual volume of the core tube 63 being effectively withdrawn from the chamber 73 per increment of longitudinal movement will leave the same volume in the connected chambers 73, 74. Thus the movement of the carriage back and forth regardless of how fast or slow will be ineffectual in changing the volume of the closed loop circuit which remains constant. This permits the use of an axial piston variable volume hydraulic motor and pump to be connected together even though there is relative movement of the pump and motor toward and away from each other.

Figure 8:
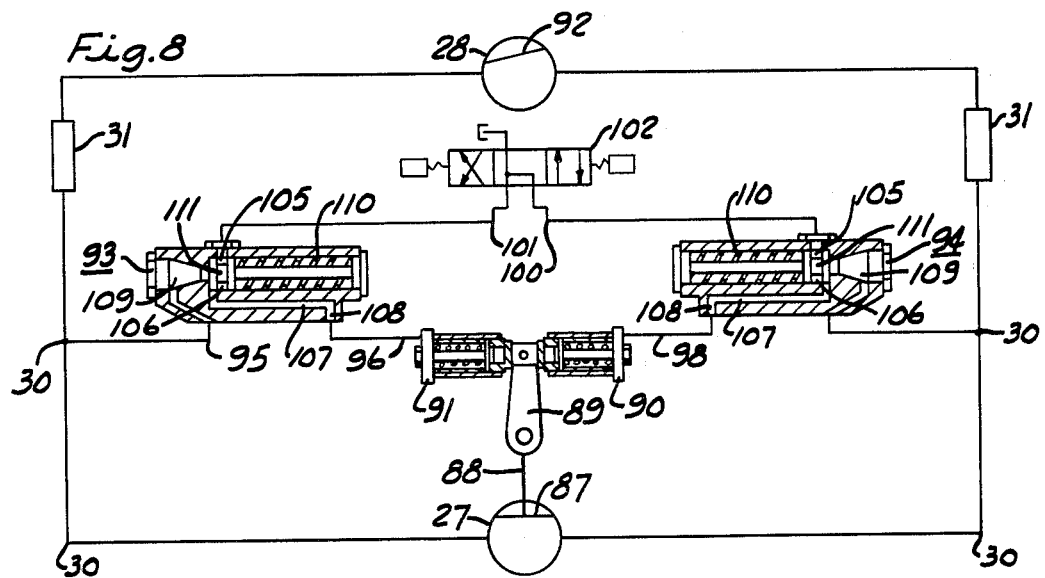
FIG. 8 is a circuit diagram of a hydraulic pump and motor connected in a closed loop circuit and the control thereof.

Referring to FIGS. 7 and 8 the pump 27 is provided with the tilting plate 87 which may be effectively tilted in either direction through the shaft 88 by means of the crank arm 89 which crank arm is moved in opposite directions by the fluid pressure means 90 and 91 with piston members. If the fluid pressure on these piston members is equal, the springs then will center the plate 87 so that it is normal to the axis of the pump. If the pressure on the piston member 90 is greater the plate 87 will tilt to the left. If the pressure in the piston member 91 is greater, the plate 87 will tilt to the right. With the plate tilted to the left let it be assumed that the fluid will flow through the closed circuit path 30 in a counterclockwise direction as shown in FIGS. 7 and 8. If the plate 78 is tilted to the right let it be assumed that the fluid will flow in a clockwise direction.

The motor 28 as shown in FIGS. 7 and 8 is also provided with a fixed tilt plate as indicated at 92.

The fluid motors 90 and 91 are each supplied with fluid under pressure from the compensators 93 and 94 which are similar to each other. The centering adjustment means 90 and 91 and the compensators 93 and 94 are all assembled within the pump housing.

As more clearly shown in FIG. 8 the compensator 93 has a fluid connection 95 to the closed circuit 30 and a fluid connection 96 to the operating piston 91. The other compensator 94 has its fluid connection 97 directly connected with the closed loop circuit 30 and its other fluid connection 98 to the piston of the centering adjustment motor 90.

The source of control of these compensators 93 and 94 is obtained from an independent fluid circuit through the lines 100 and 101 which are connected respectively to tank through the position of the valve 102 as illustrated in both FIGS. 7 and 8. In one position of this valve 102, fluid under pressure is supplied from pump 24, valve 102 to line 100 to energize the compensator 94 and tilt the plate 87 to the right causing a counterclockwise flow in the closed circuit 30 to the motor 28 which is represented by positioning the valve 102 to the right by the handle 103. The motor will be made to run in the opposite direction by circulating the fluid in the closed loop circuit 30 by tilting the plate 87 to the left when applying pressure through the line 101 to the compensator 93.

Thus by the use of this simple reversing valve 102 and the compensators 93 and 94 one may apply a pressure selectively to the port 105 where it is ineffective on the spool valve 106 and it flows through the passage 107 to the outlet 108 and the corresponding piston member for controlling the direction of tilt of the plate 87. When the pressure received from the closed loop circuit 30 is effective in the compensator port 109 so that it is greater than the pressure of the spool chamber 105 the spool valve 106 is moved to compress the spring 110 and the middle section 111 of the spool 106 shuts off the port 107. However, since the piston 90 causes the tilting plate 87 to tilt to the right the connection 97 is to the opposite or inlet side of the closed loop circuit. The operating pump can be controlled by the opposite compensator when the valve 102 is in operating position. When the valve is moved to the intermediate position as shown in FIGS. 7 and 8 both lines 100 and 101 are connected to tank and the compensator springs equalize the position of their respective valves which in turn permits the springs of the fluid adjusting pistons 90 and 91 to operate the arm 89 to adjust the shaft 88 for placing the tilt plate 87 normal to the axis of the pump shaft thereby stopping the flow of liquid through the closed loop 30 and thus stopping the motor 28. The control is through the tilt plate 87 controlled by a low pressure low volume source of fluid pressure to control a high pressure high volume system in which there is no valve.

As shown in FIGS. 4 and 7 the electric motor 16 drives the pump 27 through the gear train in the gear box 17, the pump 27 being driven through the pinion 38 and the multipump 23 being driven through the pinion 41.

As shown in FIG. 7 the pump 24 employed to control the operation as well as to supply leakage fluid to the closed loop circuit 30 is a one-half inch gear section, 10 gallons per minute pump that is connected through the line 112 to the flow divider 113 one side of which is connected by line 114 at the intermediate position of the two back-to-back check valves 115 and 116 that supply the opposite sides of the closed loop circuit 30. The supply line 114 is alleviated by the pressure relief valve 117 to tank to control this fluid pressure. This circuit is usually connected outside of the casing for the pump 27. However, inside the casing of the pump 27 a pair of oppositely disposed spring biased check valves 118 and 119 are connected in opposite directions to the opposite sides of the closed loop hydraulic circuit 30. The springs of these check valves may be set to permit the check to open and short-circuit the motor 28 upon the development of a predetermined pressure in the closed loop circuit 30.

The crowd cylinders 33 for opposite sides of the carriage are supplied with fluid pressure from the intermediate pump 25 of the multi-pump assembly 23. This pump is a one and three-fourths inch gear section pump of 39 gallons per minute and delivery from this pump through line 120 supplies fluid for the left bank of valves illustrated at 121L, 122, 123L, 124L and 125 which represent respectively the following: The valve 121L for operating the left-hand continuous track motor 126L, the valve 122 for operating the four roof jacks 7, the valve 123L for operating the front floor jack 7RF and the valve 124L for operating the front left floor jack 7LF and the valve 125 for operating the four carriage crowd cylinders 33 two of which have their cylinders mechanically and hydraulically connected to function as a pair. Each of these piston type motors are double acting and each of the traction motors are reversible. Thus the valves in each case provide a neutral position to hold the motor at the position last set and in either direction to extend or retract or otherwise reverse the motor to operate in the opposite direction.

The rear bank is supplied with hydraulic power from the one and three-fourths inch gear section pump 26 that delivers 39 gallons per minute to supply the line 130 and when the valve 121R is thrown in either direction it operates the continuous track drive motor 126R on the right-hand side of the machinery.

In like manner, the valves 123R and 124R actuate respectively the rear floor jacks 7LR and 7RR.

The valve 127 is connected to operate the hoist rotation motor 131 and the valve 128 is connected to actuate the hoist motor 132. In both of these circuits there is provided pairs of check valves 133 and 134 connected to the opposite sides of the motor lines and thence through a relief valve 135, 136 to tank. Each of the lines to the motors 131 and 132 are also provided with a combination flow restriction device 137 which allows the fluid to flow to the motor through this restriction, when flowing in the opposite direction the liquid passes freely through a corresponding check valve connected in parallel with this flow restriction.

In this manner the front and rear banks of the operating valves may be supplied with different pressure pumps and an independent pressure pump 24 in the group 23 may be supplied to not only control the pump 27 but also supply any leakage from this system.

We claim:

1. A constant volume closed loop hydraulic system comprising a hydraulic motor driven through a closed loop circuit by a hydraulic pump mounted for relative movement toward and away from each other, a pair of extension chambers in the opposite sides of said closed loop for connecting said pump and motor during their movement relative to each other, each extension chamber having an outwardly open core tube, a slide tube on each core tube having an open end with an inner slidable seal in its bore engaging its core tube, a closed loop liquid connection to the bore of each core and slide tube, the increment volume of each core tube within the bore of its slide tube being equal to its increment displacement in the bore of its slide tube to maintain a constant volume in said closed loop circuit regardless of the extended position of said slide tubes on said core tubes.

2. A constant volume closed loop hydraulic system comprising a hydraulic motor driven through a closed loop circuit by a hydraulic pump mounted for relative movement toward and away from each other, a pair of extension chambers in the opposite sides of said closed loop for connecting said pump and motor during their movement relative to each other, each extension chamber having an outer tube with a core tube opening outwardly, a slide tube extending between each core and outer tube, a closed loop liquid connection to the bore of each core and slide tube, seal means between the outer end of each slide tube and core tube to form an inner chamber and a second seal means between each slide tube and the bore of its outer tube, third seal means in the end of the bore of said outer tube and said slide tube to form an outer chamber, a radial port through said slide tube inwardly of said first and second seal means to connect said outer chamber and said inner chamber of said slide tube, an air vent to the bore of said outer tube beyond said first and second seal means on said slide tube when fully telescoped, the increment volume of said core tube within the bore of each slide tube being equal to its increment displacement in said inner chamber in the bore of its slide tube together with the volume of said inner and outer chambers changing inversely relative to each other to maintain a constant volume in said closed loop circuit regardless of the extended position of said slide tubes on said core tubes.

3. A constant volume closed loop hydraulic system comprising a hydraulic motor driven through a closed loop circuit by a hydraulic pump mounted for relative movement toward and away from each other, a pair of extension chambers in the opposite sides of said closed loop for connecting said pump and motor during their movement relative to each other, each extension chamber having an outer tube with a bore seal in the open end thereof, an outwardly open core tube secured to the inner end of each outer tube with the open ends of both of said tubes adjacent each other, a slide tube on each core tube engaging the seal of each outer tube and having an open end with an inner slidable seal in its bore engaging its core tube to form an inner chamber and an outer slidable seal at its open end engaging the bore of its corresponding outer tube to form an outer chamber with the first seal, a radial port through each slide tube adjacent said inner and outer seals to connect said inner chamber with said outer chamber, an air vent in said outer tube beyond the seals and said slide tube when fully telescoped, a closed loop liquid connection to the bore of each core and slide tube, the increment volume of each core tube within the bore of its slide tube being equal to its increment displacement in said inner chamber in the bore of its slide tube as the volume of said inner and outer chambers change inversely relative to each other to maintain a constant volume in said closed loop circuit regardless of the extended position of said slide tubes on said core tubes.

4. A constant volume closed loop hydraulic system comprising a matched hydraulic motor and pump of the axial piston variable volume type mounted for movement toward and away from each other, a continuously operating rotary prime mover rotating said pump, a rotary load to be driven by said motor, a closed hydraulic loop connecting said pump with said motor and including a pair of matched extension chambers in the opposite sides of said closed loop to maintain said closed loop connections during the relative movement of said hydraulic motor and pump to each other, a hydraulic control means for changing the direction and varying the volume to control the operation of said pump and determine the speed and power delivered thereby, each extension chamber having a core tube means and a slide tube means that extends over said core tube means in slidable sealed relation with a bore connection to each tube means to connect each extension chamber in the opposite sides of said closed loop hydraulic system, the increment volume of each core tube means within its side tube means being equal to its increment displacement in its slide tube means to maintain a constant volume in said closed circuit regardless of the relative telescoped position of each of said core and slide tube means.

5. The constant volume closed loop hydraulic system of claim 4 wherein said axial piston variable volume type hydraulic pump is provided with a tiltable plate actuated by opposed pistons and when held normal to its operating shaft delivers no liquid to the closed loop and when tilted the direction of tilt determines the direction of liquid flow and the motor rotation and the amount of tilt determines the volume and power delivered to perform the motor load.

6. The constant volume closed loop hydraulic system of claim 5 wherein said hydraulic control means includes a second source of hydraulic fluid under pressure, a hand valve to selectively block and control the direction of flow from said second hydraulic source to control said pump, a pair of compensators associated with said axial piston pump, each compensator having a spring biased spool valve with one end connected by a line to one side of said pump and the other end of the spool valve connected to a selected outlet of said hand valve and the intermediate of said spool valve connected to said hydraulic control means to determine the direction of rotation of said pump and motor and to determine the volume delivered to rotate said motor under load.

7. The constant volume closed loop hydraulic system of claim 6 which also includes two check valves connected back to back on one side and to the opposite sides of said loop, said second source of hydraulic fluid under pressure is connected to the back to back junction of said check valves, and a pressure relief valve connected to said back-to-back check valve junction.

8. The constant volume closed loop hydraulic system of claim 4 which also includes oppositely disposed spring loaded check valves connecting the opposite sides of said closed hydraulic loop between said pump and said motor.

9. The constant volume closed loop hydraulic system of claim 1 including a train of gears driven by said hydraulic motor to reduce the speed of the output load, and a fly wheel connected to said train of gears to smooth out the operating torque characteristics to the power load transmitted through said closed loop, and said gear train to an output load.

10. The constant volume closed loop hydraulic system of claim 9 wherein said fly wheel is connected to the shaft of said hydraulic motor.

11. A constant volume closed loop hydraulic system comprising a matched hydraulic motor and pump of the axial piston variable volume type, said motor driven through a closed loop circuit by said hydraulic pump, a train of gears driven by said motor to reduce the speed of the output load driven from the last gear of the train, and a fly wheel on said motor and gear train to smooth the hydraulic pulses transmitted through said closed loop and to smooth out the operating torque characteristics to the load driven thereby.

12. The constant volume closed loop hydraulic system of claim 11 including an extension chamber in each side of said closed loop between said motor and pump, each extending chamber having an outer tube with a bore seal in the open end thereof, an outwardly open core tube secured to the inner end of each outer tube with the open ends of both of said core and outer tubes adjacent each other, a slide tube on each core tube engaging the seal of each outer tube end having an open end with an inner slidable seal in its bore engaging its core tube to form an inner chamber and an outer slidable seal at its open end engaging the bore of its corresponding outer tube to form an outer chamber with said first seal, a radial port through said slide tube adjacent said inner and outer seals to connect said inner chamber with said outer chamber, an air vent in said outer tube beyond the seals on said slide tube when fully telescoped, the increment volume of said core tube within the bore of each slide tube being equal to its increment displacement in said inner chamber in the bore of its slide tube together with the volume of said inner and outer chambers changing inversely relative to each other to maintain a constant volume in said closed loop circuit regardless of the extended position of said slide tubes on said core tubes.

13. The constant volume closed loop hydraulic system of claim 12 wherein said axial piston variable volume type hydraulic pump is provided with a tiltable plate actuated by opposed pistons and when held normal to its operating shaft delivers no liquid to the closed loop and when tilted the direction of tilt determines the direction of motor rotation and the amount of tilt determines the hydraulic volume and power delivered to perform the motor load.

14. The constant volume closed loop hydraulic system of claim 13 wherein said hydraulic control means includes a second source of hydraulic fluid under pressure, a valve to selectively block and control the direction of flow from said second hydraulic source to said pump, a pair of compensators associated with said axial piston pump, each compensator having a spring biased spool valve with one end connected by a line to one side of said pump and the other end connected to a selected outlet of said hand valve and the intermediate of said spool valve connected to said hydraulic control means to determine the direction of rotation of said pump and motor and to determine the volume delivered to rotate said motor under load.

15. The constant volume closed loop hydraulic system of claim 14 which also includes two check valves connected back to back on one side and on their other sides to the opposite sides of said closed loop, said second source of hydraulic fluid under pressure is connected to the back-to-back junction of said check valves, and a pressure relief valve connected to said back-to-back junction.

16. The constant volume closed loop hydraulic system of claim 14 which also includes oppositely disposed spring loaded check valves connecting the opposite sides of said closed hydraulic loop between said pump and said motor.

17. The constant volume closed loop hydraulic system of claim 2 which includes a stop between said slide tube and said outer tube to retain said radial port within the bore of said outer tube.

18. A constant volume closed loop hydraulic system comprising a matched hydraulic motor and pump of the axial piston variable volume type, a closed loop circuit connecting said pump and motor to operate a load, a tiltable plate actuated by opposed pistons in said pump which plate when normal to the operating shaft of the pump delivers no liquid to said motor through said closed loop circuit, and when tilted the direction of tilt determines the direction of hydraulic flow through said closed loop circuit, therefore, the direction of motor rotation and the amount of plate tilt determines the hydraulic volume and power delivered to perform the motor load, compensator means for each of said opposed pistons, a second source of hydraulic fluid under pressure, a valve to block hydraulic pressure from said sceond source and vent said compensator means to tank in its normal position, said valve to selectively connect tank and hydraulic pressure from said second source of hydraulic pressure to said compensator means to selectively tilt said plate and create directional hydraulic flow through said closed loop to operate said motor.

19. The constant volume closed loop hydraulic system of claim 18 which includes preloaded biasing springs for each of said opposed pistons and each compensator means to balance said closed loop circuit, the opposite compensator to that selected to determine the direction of rotation of said pump having a line connected to the pressure side of said pump when said plate is tilted to control the system pressure in accordance with the setting of said preloaded biasing springs.

20. The constant volume closed loop hydraulic system of claim 19 which includes means for moving said pump and motor toward and away from each other, a pair of extension cylinders in the opposite sides of said closed loop for connecting said pump and motor during their movement relative to each other, each extension chamber having an outer tube with a core tube opening outwardly, a slide tube extending between core and outer tube, a closed loop liquid connection to the bore of each core and slide tube, seal means between the outer end of each slide tube and core tube to form an inner chamber and a second seal means between each slide tube and the bore of its outer tube, third seal means in the end of the bore of said outer tube and said slide tube to form an outer chamber, a radial port through said slide tube inwardly of said first and second seal means to connect said outer chamber and said inner chamber of said slide tube, an air vent to the bore of said outer tube beyond said first and second seal means on said slide tube when fully telescoped, the increment volume of said core tube within the bore of each slide tube being equal to its increment displacement in said inner chamber in the bore of its slide tube together with the volume of said inner and outer chambers changing inversely relative to each other to maintain a constant volume in said closed loop circuit regardless of the extended position of said slide tubes on said core tubes.

References Cited by the Examiner
UNITED STATES PATENTS 3,036,434  5/1962  Mark _____ 60—53
3,078,674  2/1963  Anderson _____ 60—52

EDGAR W. GEOGHEGAN, *Examiner.*